(12) United States Patent
Hoppen

(10) Patent No.: US 7,050,223 B1
(45) Date of Patent: May 23, 2006

(54) DUV-CAPABLE MICROSCOPE OBJECTIVE WITH PARFOCAL IR FOCUS

(75) Inventor: Gerhard Hoppen, Wetzlar (DE)

(73) Assignee: Leica Microsystems Semiconductor GmbH, Wetzlar (DE)

( * ) Notice: Subject to any disclaimer, the term of this patent is extended or adjusted under 35 U.S.C. 154(b) by 24 days.

(21) Appl. No.: 09/598,406

(22) Filed: Jun. 21, 2000

(30) Foreign Application Priority Data

Jul. 9, 1999 (DE) ................................ 199 31 949

(51) Int. Cl.
*G02B 13/14* (2006.01)
*G02B 21/02* (2006.01)

(52) U.S. Cl. ..................... 359/356; 359/355; 359/350; 359/656; 359/357

(58) Field of Classification Search ................ 359/350, 359/355, 356, 357, 361, 368, 656, 657, 658, 359/659, 660, 661, 435
See application file for complete search history.

(56) References Cited

U.S. PATENT DOCUMENTS

| | | | | |
|---|---|---|---|---|
| 3,975,087 A | * | 8/1976 | Shoemaker | ................. 359/656 |
| 5,103,341 A | | 4/1992 | Ulrich et al. | ................ 359/657 |
| 5,121,255 A | * | 6/1992 | Hayashi | ....................... 359/656 |
| 5,142,410 A | * | 8/1992 | Ono et al. | .................... 359/435 |
| 5,144,475 A | * | 9/1992 | Hayashi | ....................... 359/350 |
| 5,159,492 A | * | 10/1992 | Hayashi | ....................... 359/350 |
| 5,717,518 A | * | 2/1998 | Shafer et al. | ................ 359/357 |

FOREIGN PATENT DOCUMENTS

DE 39 15 868 11/1990

OTHER PUBLICATIONS

Optics (Hecht and Zajac, Addision and Wesley, 1979, pp. 186-191).*

* cited by examiner

*Primary Examiner*—Audrey Chang
(74) *Attorney, Agent, or Firm*—Foley & Lardner LLP

(57) ABSTRACT

A DUV-capable dry objective for microscopes comprises lens groups made of quartz glass, fluorite, and in some cases also lithium fluoride. It possesses a DUV focus for a DUV wavelength region $\lambda_{DUV} \pm \Delta\lambda$, where $\Delta\lambda = 8$ nm, and additionally a parfocal IR focus for an IR wavelength $\lambda_{IR}$, where 760 nm $\geq \lambda_{IR} \geq$ 920 nm. For that purpose, the penultimate element is of concave configuration on both sides, and its object-side outer radius is much smaller than its image-side outer radius. The DUV objective is IR autofocus-capable.

26 Claims, 27 Drawing Sheets

Table 1:

125x/0.90 objective of Fig. 1; focal length f = 1.6 mm;
parfocal focus at $\lambda_{DUV}$ = 248 nm, $\lambda_{IR}$ = 760 nm;

| Surface | Radius | Spacing | Glass type |
|---:|---:|---:|---|
| 1 | Plane surface | .4424 | |
| 2 | -.7759 | .8568 | Quartz glass |
| 3 | -.9149 | .1000 | |
| 4 | -14.1404 | 1.7790 | $CaF_2$ |
| 5 | -2.6823 | .1500 | |
| 6 | -8.4514 | 1.2000 | Quartz glass |
| 7 | 6.6947 | 4.0000 | $CaF_2$ |
| 8 | -5.4651 | .3000 | |
| 9 | 23.3873 | 3.0000 | $CaF_2$ |
| 10 | -5.2007 | 1.5000 | Quartz glass |
| 11 | 6.5944 | 3.3000 | $CaF_2$ |
| 12 | -9.8177 | .3000 | |
| 13 | 55.5878 | 1.5000 | Quartz glass |
| 14 | 6.9453 | 4.7000 | $CaF_2$ |
| 15 | -5.5509 | 1.5000 | Quartz glass |
| 16 | 46.0867 | .5000 | |
| 17 | 8.0439 | 3.6991 | $CaF_2$ |
| 18 | -7.9818 | 1.5000 | Quartz glass |
| 19 | -15.3526 | 2.4491 | |
| 20 | -4.5852 | 1.0000 | Quartz glass |
| 21 | 4.9685 | 1.8000 | $CaF_2$ |
| 22 | 17.1649 | 10.5044 | |
| 23 | 35.5703 | 1.8000 | Quartz glass |
| 24 | -3.9748 | 1.0000 | $CaF_2$ |
| 25 | 11.7442 | | |

*Fig. 5*

Table 2:

150x/0.90 objective of Fig. 2; focal length f = 1.33 mm;
parfocal focus at $\lambda_{DUV}$ = 248 nm, $\lambda_{IR}$ = 825 nm;

| Surface | Radius | Spacing | Glass type |
|---|---|---|---|
| 1 | Plane surface | .4715 | |
| 2 | -.7980 | .8200 | Quartz glass |
| 3 | -.9220 | .1000 | |
| 4 | -13.2322 | 1.7655 | CaF$_2$ |
| 5 | -2.5295 | .1300 | |
| 6 | -5.4990 | 1.2000 | Quartz glass |
| 7 | 6.4887 | 4.0000 | CaF$_2$ |
| 8 | -5.4508 | .3000 | |
| 9 | 19.0418 | 3.9000 | CaF$_2$ |
| 10 | -5.4344 | 1.5000 | Quartz glass |
| 11 | 7.8911 | 3.5000 | CaF$_2$ |
| 12 | -11.1917 | .3000 | |
| 13 | 28.4123 | 1.5000 | Quartz glass |
| 14 | 5.9362 | 4.5000 | CaF$_2$ |
| 15 | -7.1436 | 1.5000 | Quartz glass |
| 16 | 53.0171 | .3000 | |
| 17 | 8.6308 | 5.0000 | CaF$_2$ |
| 18 | -13.7614 | 2.5134 | |
| 19 | -4.8385 | 1.0000 | Quartz glass |
| 20 | 3.2133 | 2.3000 | CaF$_2$ |
| 21 | -6.5982 | 1.0000 | Quartz glass |
| 22 | 15.8712 | 8.7871 | |
| 23 | 16.0258 | 1.8000 | Quartz glass |
| 24 | -2.7600 | 1.0000 | CaF$_2$ |
| 25 | 5.6344 | | |

*Fig. 6*

Table 3:

150x/0.90 objective of Fig. 3; focal length f = 1.33 mm;
parfocal focus at $\lambda_{DUV}$ = 248 nm, $\lambda_{IR}$ = 885 nm;

| Surface | Radius | Spacing | Glass type |
|---|---|---|---|
| 1 | Plane surface | .3978 | |
| 2 | -1.0391 | 1.0168 | Quartz glass |
| 3 | -1.0795 | .1000 | |
| 4 | -12.0535 | 1.7830 | $CaF_2$ |
| 5 | -2.5872 | .1000 | |
| 6 | -4.1758 | 1.2000 | Quartz glass |
| 7 | 7.1597 | 4.0100 | $CaF_2$ |
| 8 | -5.7651 | .4000 | |
| 9 | 18.3192 | 4.0100 | $CaF_2$ |
| 10 | -6.0823 | 1.5000 | Quartz glass |
| 11 | 11.0395 | 3.9100 | $CaF_2$ |
| 12 | -13.2977 | .2000 | |
| 13 | 45.5404 | 1.5000 | Quartz glass |
| 14 | 8.4487 | 4.5200 | $CaF_2$ |
| 15 | -8.8498 | 1.5000 | Quartz glass |
| 16 | 97.3172 | .1000 | |
| 17 | 9.4897 | 2.5000 | $CaF_2$ |
| 18 | -36.7659 | .2000 | |
| 19 | 12.4177 | 2.5000 | $CaF_2$ |
| 20 | -12.5815 | 1.5000 | Quartz glass |
| 21 | 70.4961 | 2.1332 | |
| 22 | -6.0761 | 1.0000 | Quartz glass |
| 23 | 2.8129 | 2.3200 | $CaF_2$ |
| 24 | -3.8598 | 1.0000 | Quartz glass |
| 25 | 8.5312 | 8.0000 | |
| 26 | -3.4258 | 1.0100 | $CaF_2$ |
| 27 | 3.0950 | 1.7000 | Quartz glass |
| 28 | -9.3744 | | |

*Fig. 7*

Table 4:

150x/0.90 objective of Fig. 4; focal length f = 1.33 mm;
parfocal focus at $\lambda_{DUV}$ = 248 nm, $\lambda_{IR}$ = 905 nm;

| Surface | Radius | Spacing | Glass type |
|---|---|---|---|
| 1 | Plane surface | .3616 | |
| 2 | -1.3020 | 1.2200 | Quartz glass |
| 3 | -1.3020 | .1000 | |
| 4 | -17.6430 | 2.1000 | CaF$_2$ |
| 5 | -3.0030 | .1000 | |
| 6 | -6.5030 | 1.2000 | Quartz glass |
| 7 | 6.8830 | 4.1600 | CaF$_2$ |
| 8 | -6.6690 | .4000 | |
| 9 | 16.0110 | 4.3100 | CaF$_2$ |
| 10 | -6.0840 | 1.5000 | Quartz glass |
| 11 | 8.3030 | 3.9100 | CaF$_2$ |
| 12 | -13.4630 | .2000 | |
| 13 | 27.1870 | 1.5000 | Quartz glass |
| 14 | 6.7340 | 4.7200 | CaF$_2$ |
| 15 | -8.1590 | 1.5000 | Quartz glass |
| 16 | 124.0130 | .1000 | |
| 17 | 8.4150 | 4.4000 | CaF$_2$ |
| 18 | -19.5190 | 2.9750 | |
| 19 | -5.5020 | 1.0000 | Quartz glass |
| 20 | 3.5790 | 2.3200 | CaF$_2$ |
| 21 | -5.7860 | 1.0000 | Quartz glass |
| 22 | 57.9860 | 7.8000 | |
| 23 | -3.5800 | 1.0100 | CaF$_2$ |
| 24 | 2.5570 | 1.7000 | Quartz glass |
| 25 | -17.9020 | | |

*Fig. 8*

Table 5:

Tube lens with focal length f = 200 mm, compensated for $\lambda_{DUV}$ = 248 nm;

| Surface | Radius | Spacing | Glass type |
|---|---|---|---|
| 1 | 135.2310 | 3.0000 | Quartz glass |
| 2 | -135.2310 | 12.4700 | |
| 3 | -52.0050 | 2.5000 | CaF$_2$ |
| 4 | 63.5370 | 3.0000 | Quartz glass |
| 5 | -91.1040 | 180.0000 | |
| 6 | Plane surface | | |

*Fig. 14*

Table 6:

150x/0.90 objective of Fig. 17; focal length f = 1.33 mm;
parfocal focus at $\lambda_{DUV}$ = 266 nm, $\lambda_{IR}$ = 780 nm;

| Surface | Radius | Spacing | Glass type |
|---:|---:|---:|---|
| 1 | Plane surface | .4004 | |
| 2 | -1.1202 | 1.0852 | Quartz glass |
| 3 | -1.0087 | .1000 | |
| 4 | 49.3954 | 1.5523 | $CaF_2$ |
| 5 | -2.4823 | 1.2000 | Quartz glass |
| 6 | 7.3997 | 4.0000 | $CaF_2$ |
| 7 | -5.5523 | .4000 | |
| 8 | 19.0870 | 4.0000 | $CaF_2$ |
| 9 | -6.1526 | 1.5000 | Quartz glass |
| 10 | 10.1480 | 3.9000 | $CaF_2$ |
| 11 | -13.4739 | .2000 | |
| 12 | 40.8014 | 1.5000 | Quartz glass |
| 13 | 9.6623 | 4.5000 | $CaF_2$ |
| 14 | -8.0263 | 1.5000 | Quartz glass |
| 15 | 67.3707 | .1000 | |
| 16 | 11.0979 | 2.5000 | $CaF_2$ |
| 17 | -29.5998 | .2000 | |
| 18 | 12.8003 | 3.0000 | $CaF_2$ |
| 19 | -14.4505 | 2.0000 | Quartz glass |
| 20 | -731.5254 | 1.9420 | |
| 21 | -6.2505 | 1.0000 | Quartz glass |
| 22 | 3.7350 | 2.3000 | $CaF_2$ |
| 23 | -5.4666 | 1.0000 | Quartz glass |
| 24 | 16.8497 | 7.2445 | |
| 25 | -4.7127 | 1.0000 | $CaF_2$ |
| 26 | 3.2030 | 1.7000 | Quartz glass |
| 27 | -76.4922 | | |

*Fig. 20*

Table 7:

150x/0.90 objective of Fig. 18; focal length f = 1.33 mm;
parfocal focus at $\lambda_{DUV}$ = 266 nm, $\lambda_{IR}$ = 785 nm;

| Surface | Radius | Spacing | Glass type |
|---|---|---|---|
| 1 | Plane surface | .3913 | |
| 2 | -1.0196 | .9862 | Quartz glass |
| 3 | -1.0164 | .1000 | |
| 4 | -13.2444 | 1.6752 | $CaF_2$ |
| 5 | -2.4758 | .1000 | |
| 6 | -3.5785 | 1.2000 | Quartz glass |
| 7 | 7.1241 | 4.0100 | $CaF_2$ |
| 8 | -5.5472 | .4000 | |
| 9 | 17.3980 | 4.0100 | $CaF_2$ |
| 10 | -5.8544 | 1.5000 | Quartz glass |
| 11 | 9.6704 | 3.9100 | $CaF_2$ |
| 12 | -13.1275 | .2000 | |
| 13 | 48.8685 | 1.5000 | Quartz glass |
| 14 | 9.6857 | 4.5200 | $CaF_2$ |
| 15 | -8.6827 | 1.5000 | Quartz glass |
| 16 | 54.4105 | .1000 | |
| 17 | 10.6335 | 2.5000 | $CaF_2$ |
| 18 | -29.6393 | .2000 | |
| 19 | 13.2319 | 3.0000 | $CaF_2$ |
| 20 | -14.2067 | 2.2117 | Quartz glass |
| 21 | -767.1858 | 1.5628 | |
| 22 | -6.0019 | 1.0000 | Quartz glass |
| 23 | 3.5393 | 2.3200 | $CaF_2$ |
| 24 | -5.3970 | 1.0000 | Quartz glass |
| 25 | 14.9886 | 7.3016 | |
| 26 | -4.5195 | 1.0100 | $CaF_2$ |
| 27 | 3.4871 | 1.7000 | Quartz glass |
| 28 | -31.4479 | | |

*Fig. 21*

Table 8:

150x/0.90 objective of Fig. 19; focal length f = 1.33 mm;
parfocal focus at $\lambda_{DUV}$ = 266 nm, $\lambda_{IR}$ = 845 nm;

| Surface | Radius | Spacing | Glass type |
|---:|---:|---:|---|
| 1 | Plane surface | .3853 | |
| 2 | -1.1597 | 1.0912 | Quartz glass |
| 3 | -1.0066 | .1000 | |
| 4 | 153.0501 | 1.6852 | $CaF_2$ |
| 5 | -2.4795 | 1.2000 | Quartz glass |
| 6 | 7.5483 | 4.0000 | $CaF_2$ |
| 7 | -5.6057 | .4000 | |
| 8 | 20.5139 | 4.0000 | $CaF_2$ |
| 9 | -6.2094 | 1.5000 | Quartz glass |
| 10 | 10.1688 | 3.9000 | $CaF_2$ |
| 11 | -13.5130 | .2000 | |
| 12 | 37.7683 | 1.5000 | Quartz glass |
| 13 | 9.5611 | 4.5000 | $CaF_2$ |
| 14 | -8.2853 | 1.5000 | Quartz glass |
| 15 | 79.4258 | .1000 | |
| 16 | 11.1475 | 2.5000 | $CaF_2$ |
| 17 | -29.0722 | .2000 | |
| 18 | 12.4744 | 3.0000 | $CaF_2$ |
| 19 | -13.8729 | 1.9205 | Quartz glass |
| 20 | -380.5331 | 2.1110 | |
| 21 | -6.3024 | 1.0000 | Quartz glass |
| 22 | 3.8900 | 2.3000 | LiF |
| 23 | -5.5040 | 1.0000 | Quartz glass |
| 24 | 18.3383 | 7.2255 | |
| 25 | -4.7881 | 1.0000 | $CaF_2$ |
| 26 | 3.1827 | 1.7000 | Quartz glass |
| 27 | -45.2603 | | |

*Fig. 22*

Table 9:

Tube lens with focal length f = 200 mm, compensated for $\lambda_{DUV}$ = 266 nm;

| Surface | Radius | Spacing | Glass type |
|---|---|---|---|
| 1 | 211.0390 | 3.0000 | Quartz glass |
| 2 | -54.8030 | 11.9840 | |
| 3 | -41.6350 | 2.5100 | $CaF_2$ |
| 4 | 67.9580 | 3.0000 | Quartz glass |
| 5 | -162.8050 | 33.6460 | |
| 6 | Plane surface | 26.0000 | Quartz glass |
| 7 | Plane surface | 119.0300 | |
| 8 | Plane surface | | |

*Fig. 27*

DUV-CAPABLE MICROSCOPE OBJECTIVE WITH PARFOCAL IR FOCUS

FIELD OF THE INVENTION

The invention concerns a DUV-capable microscope objective having the features described herein.

BACKGROUND OF THE INVENTION

The resolution of a microscope depends substantially on the wavelength of the illumination light used. Conventional microscopes are operated with light in the visible wavelength region (abbreviated "VIS"). In order to resolve extremely small structures, for example on wafers or circuits in the semiconductor industry, imaging at shorter wavelengths in the deep-ultraviolet region of the light spectrum (abbreviated "DUV") is required. The microscope image is made visible using a TV camera that is sensitive to the DUV light.

The materials in conventional VIS optics are not transparent to DUV. DUV operation therefore requires optics constructed from special materials, for example prisms, beam splitters, and tube lenses, as well as objectives that are corrected for DUV wavelengths. In order to meet future requirements of the semiconductor industry, a DUV microscope preferably has capabilities for switching between VIS and DUV optics and the respective associated illuminating systems, in which a switchover between VIS and DUV objectives is also made.

In addition, the autofocus function of a microscope is an essential requirement in the semiconductor industry, since automatic (and therefore more rapid) focusing can considerably increase the number of features examined per hour as compared to manual focusing.

Known IR laser autofocus systems are greatly superior in this context, because of their higher focusing speed, to other autofocus systems (e.g. TV autofocus systems) which operate at the particular wavelength being imaged. The autofocus wavelength is shifted into the IR wavelength region so that the IR autofocus light can easily be coupled in, for example via a dichroic splitter in the imaging beam path. This prevents any loss of portions of the illuminating or imaging beam in the VIS or DUV/UV wavelength regions.

The ability for a DUV microscope also to be operated with a fast IR autofocus system is therefore a pressing need in the semiconductor industry. IR autofocus-capable objectives already exist for the VIS region, but not yet for the DUV region. In particular, a well-corrected DUV objective with high magnification and a large aperture is necessary in order to image extremely small features.

DE 39 15 868 C2 describes a 100×/0.87 DUV objective with a focal length of approximately 1.5 mm and a numerical aperture of 0.87. It comprises at least eleven lenses, which constitute a front lens group and a rear lens group. The rear lens group is configured as a shifting element. By displacing the shifting element, it is possible to change the air gap from the front lens group and thus adjust the usable wavelength region in the DUV and in a portion of the visible spectrum. The objective's correction for spherical aberration, however—for example at the common DUV illumination wavelength of 248 nm—is not particularly good. The greatest disadvantage, however, is that the objective does not have a parfocal focus in the near infrared wavelength region (abbreviated "IR"), i.e. at IR wavelengths>760 nm. The objective is therefore not suitable for use on a DUV microscope having an IR laser autofocus apparatus that works with IR wavelengths.

SUMMARY OF THE INVENTION

It is therefore the object of the present invention to describe a very well-corrected DUV objective having a numerical aperture of at least 0.80 and a short focal length, which is IR autofocus-capable.

This object is achieved by a DUV objective that has the features described herein. Advantageous embodiments of the objective are also described.

An objective according to the present invention comprises a system of lenses ma of quartz glass and fluorite. It has a focus in a wavelength band around a DUV wavelength $\lambda_{DUV}$ selected for DUV illumination, and the same focus for an IR wavelength $\lambda_{IR}$ in the near IR region. It was hitherto considered impossible to compute a focus combination of this kind, since with usual computation starting parameters and current methods and theories of optical computation an objective of this kind, focusing in both IR and DUV, was believed to be impossible to realize. The criteria used for evaluating the focusing properties are the so-called spectral image locus curves of an objective, which involve a comparison between the image locus curve for the paraxial region and the image locus curve for full aperture. The spectral image locus curves indicate the focal points of the objective as a function of wavelength.

It has been found, surprisingly, that by way of a specific configuration of the Penultimate element of an objective, the aforementioned two spectral image locus curves of an objective can be made almost coincident over the entire wavelength region from DUV to IR: according to the present invention, this penultimate element is of concave configuration on both sides, and its object-side outer radius is much smaller than the image-size outer radius.

Good agreement between the two image locus curves indicates good correction of spherical aberration. Depending on the exemplary embodiment of the objective according to the present invention, the penultimate element is constructed either as a doublet or a triplet, or as a double in combination with an individual lens, or as individual lenses only. As materials, combinations of quartz glass and fluorite or of quartz glass and lithium fluoride can be used. Specific sequences of materials prove advantageous in this context. In one advantageous embodiment, for example, a doublet has the material sequence quartz glass/fluorite in the imaging direction, respectively a triplet has the material sequence quartz glass/fluorite/quartz glass or quartz glass/lithium fluoride/quartz glass in the imaging direction.

As a result of the size relationship according to the present invention among the outside radii, the imaging beam that up to that point has been slightly deflected by the preceding lenses or cemented groups is strongly refracted. This kind of beam deflection violates the rule ordinarily applied in optical computation that the beam must always be modified smoothly at each imaging element. For example, a sharp transition in the beam makes the objective highly sensitive to tolerances, so that an objective of this kind is difficult to produce or makes stringent demands in terms of production.

On the other hand, however, only with a penultimate element having this particular shape did it prove possible to achieve the same focus both for a region around a DUV wavelength $\lambda_{DUV}$ and for an IR wavelength $\lambda_{IR}$. If the relevant penultimate element is equipped, in an objective according to the present invention, with a moderate shape so that the previously deflected beam profile is smoothed again, then both the good correction and the focus for the IR wavelength $\lambda_{IR}$ are lost.

The spectral image locus curves of an objective according to the present invention have, at the selected DUV wavelength $\lambda_{DUV}$, a minimum which indicates the focal point for that wavelength $\lambda_{DUV}$. In the IR wavelength region, the image locus curve has a zero transition at the desired IR wavelength $\lambda_{IR}$. In other words, the focal points of the DUV wavelength $\lambda_{DUV}$ and of the IR wavelength $\lambda_{IR}$ are the same, i.e. confocal. In addition, the paraxial image locus curve and image locus curve for full aperture are almost identical over the spectral range from $\lambda_{DUV}$ to $\lambda_{IR}$.

Since the spectral image locus curve extends, around its minimum at $\lambda_{DUV}$, within the depth of field in a wavelength band $\lambda_{DUV} \pm \Delta\lambda$ (where $\Delta\lambda=8$ nm), this entire DUV wavelength band can be used for imaging. This offers the advantage, as compared to a monochromatic focus in the DUV, that an expensive laser is not necessary for illuminating the microscope, but instead that a more economical DUV spectral lamp with a finite line width is sufficient. It is possible, however, to use any laser line that falls in the vicinity of the DUV wavelength band, since that laser line is monochromatic and monochromatic illumination will eliminate any chromatic errors in the image.

If a specific DUV wavelength is then taken as the basis for calculating the DUV focus, with a penultimate element according to the present invention it is in fact possible to construct an objective to match each of a number of IR focus wavelengths. As a result, a respective IR autofocus-capable DUV objective can be described for IR wavelengths $\leq 760$ nm, i.e. to match a plurality of possible IR laser diodes for an IR laser autofocus system.

The objectives according to the present invention have short focal lengths of no more than 1.6 mm, a large aperture of at least 0.9, and good correction of all image errors. The working distance is between approximately 0.19 and 0.22 mm, depending on the exemplary embodiment. The DUV focus may lie between 200 nm and 300 nm.

BRIEF DESCRIPTION OF THE DRAWINGS

The subject matter of the invention is described with reference to the embodiments shown in the drawings.

FIG. 5 shows Table 1 having the design data for the first objective of FIG. 1;

FIG. 6 shows Table 2 having the design data for the second objective of FIG. 2;

FIG. 7 shows Table 3 having the design data for the third objective of FIG. 3;

FIG. 8 shows Table 4 having the design data for the fourth objective of FIG. 4;

FIG. 14 shows Table 5 having the design data for the tube lens system of FIG. 13;

FIG. 20 shows Table 6 having the design data for the fifth objective of FIG. 17;

FIG. 21 shows Table 7 having the design data for the sixth objective of FIG. 18;

FIG. 22 shows Table 8 having the design data for the seventh objective of FIG. 19;

FIG. 27 shows Table 9 having the design data for the tube lens system of FIG. 26.

DETAILED DESCRIPTION OF THE INVENTION

Figure 17:
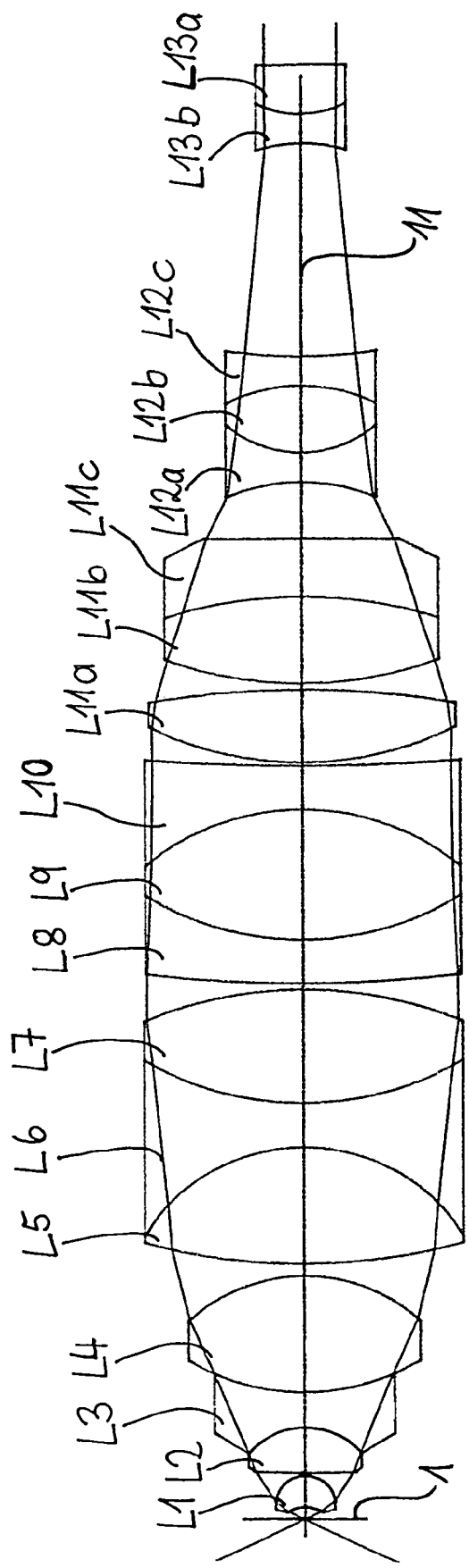
FIG. 17 shows a section through a fifth objective according to the present invention having a DUV focus at $\lambda_{DUV}=266$ nm and an IR focus at $\lambda_{IR}=760$ nm.
Figure 18:
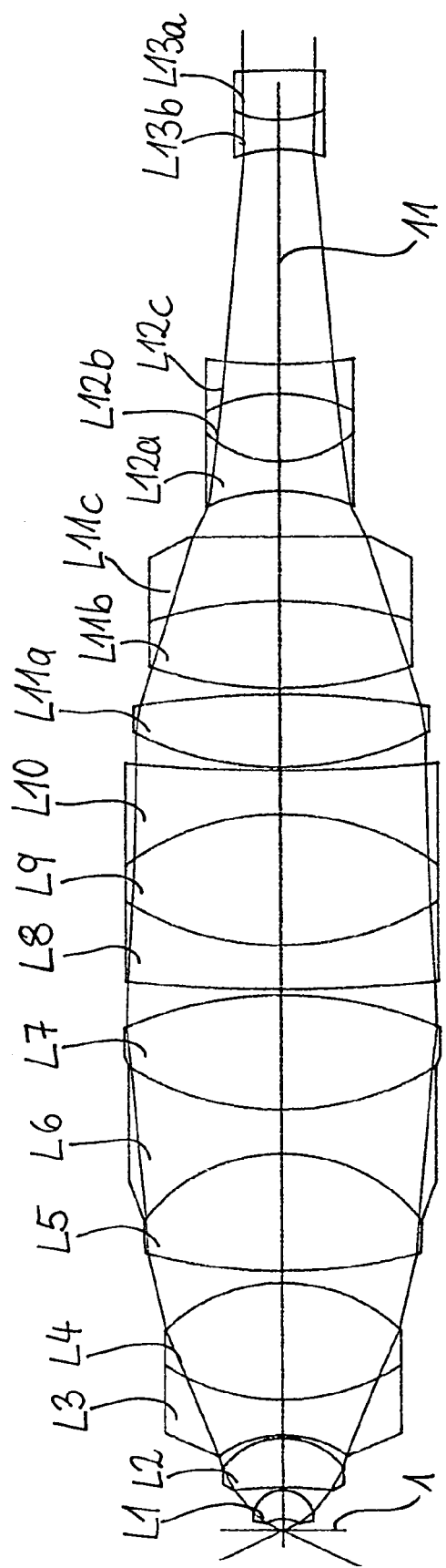
FIG. 18 shows a section through a sixth objective according to the present invention having a DUV focus at $\lambda_{DUV}=266$ nm and an IR focus at $\lambda_{IR}=785$ nm.
Figure 19:
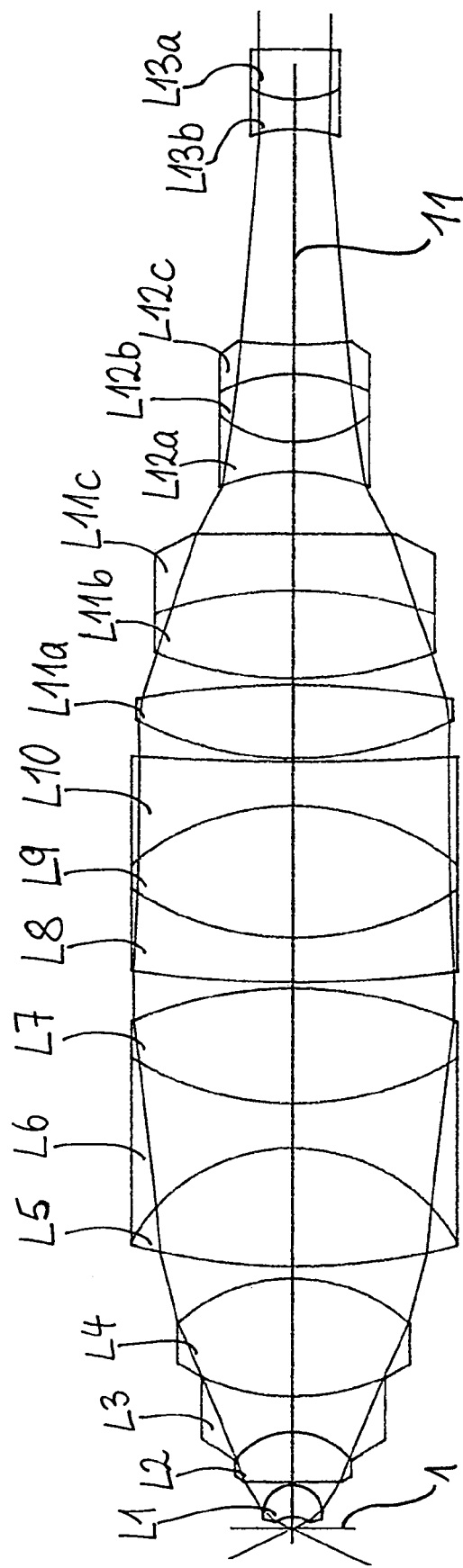
FIG. 19 shows a section through a seventh objective according to the present invention having a DUV focus at $\lambda_{DUV}=266$ nm and an IR focus at $\lambda_{IR}=845$ nm.

The objectives in FIGS. 1 through 4 are all corrected for a DUV wavelength region $\lambda_{DUV}=248$ nm$\pm 8$ nm, and differ in terms of the IR focus wavelengths indicated. The objectives in FIGS. 17 through 19 are all corrected for a DUV wavelength region $\lambda_{DUV}=266$ nm$\pm 8$ nm, and differ in terms of the IR focus wavelengths indicated. The field-of-view (FOV) number for all the exemplary embodiments is 11. The working distance is between 0.19 and 0.22 mm depending on the exemplary embodiment.

Viewed in the direction of the light, the exemplary embodiments cited share, in principle, the following schematic configuration:

a converging individual first lens L1 made of quartz glass as the front lens;

a converging individual second lens L2 made of fluorite;

a first doublet comprising a diverging third lens L3 made of quartz glass and a converging fourth lens L4 made of fluorite;

a first triplet L5+L6+L7 combined of a fifth lens L5 made of fluorite, a sixth lens L6 made of quartz glass and a seventh lens L7 made fluorite a second triplet L8+L9+L10 combined of a eighth lens made of quartz glass and a ninth lens made of fluorite and a tenth lens made of quartz glass;

a converging lens group L11 with a configuration that differs depending on the exemplary embodiment, either as an individual eleventh lens L11 or as a doublet combined of two lenses L11a+L11b or as an individual lens L11a followed by a doublet combined of two lenses L11b+L11c;

a diverging element according to the present invention, which is concave on both sides and whose object-side outer radius is much smaller than the image-side outer radius, and which can be differently configured depending on the exemplary embodiment, e.g. as a diverging doublet combined of two lenses L12a+L12b or as a triplet combined of three lenses L12a+L12b+L12c;

a diverging doublet L13a+L13b combined of a converging lens L13a made of quartz glass and a diverging lens L13b made of fluorite.

The individual exemplary embodiments and the variants of the schematic configuration recited above will be described below. In the sectioned drawings, an object 1 is in focus. Of the lenses on an optical axis 11, L1 is always a front lens.

The tables having the design data, and the spectral image locus curves, are indicated in each case when the examples are described. In the Tables having the design data, surface 1 designates in each case the position of object 1 in focus. The subsequent surfaces are continuously numbered in sequence.

The spectral image locus curve for the paraxial region is depicted in each case as a dotted line, and the spectral image locus curve for the full aperture in each case as a solid line. The image locus curves each exhibit a minimum at a DUV wavelength $\lambda_{DUV}$ that defines a zero line, as well as a zero transition at an IR wavelength $\lambda_{IR}$. A DUV wavelength band within which the objective is in focus is defined in each case around the minimum within the depth of field $\lambda_{DUV} \pm 8$ nm). The zero transition designates a focus at the IR wavelength $\lambda_{IR}$ that is parfocal with the DUV focus.

Figure 1:
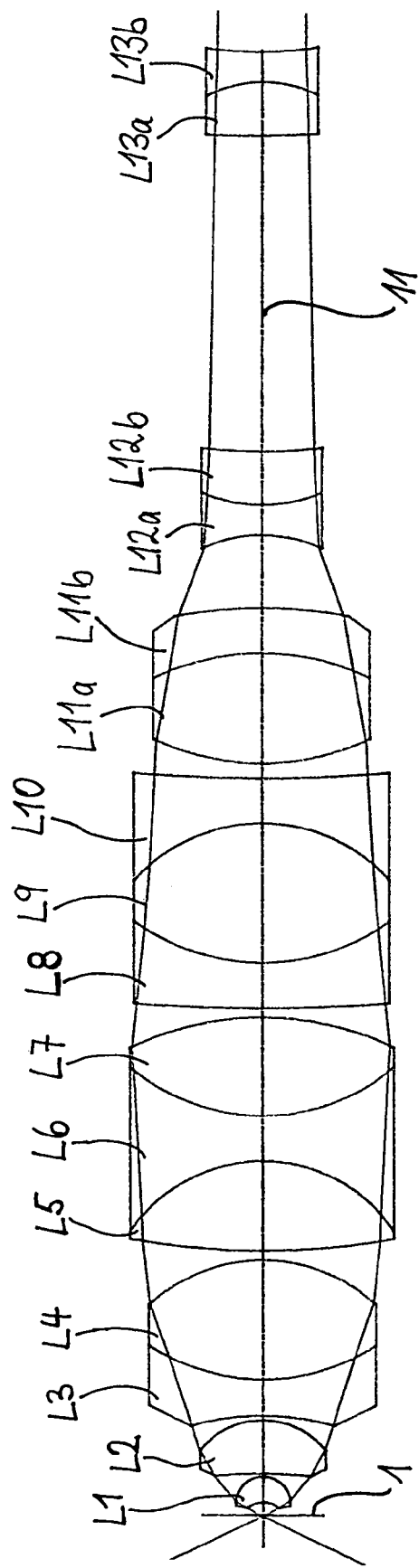
FIG. 1 shows a section through a first objective according to the present invention having a DUV focus at $\lambda_{DUV}=248$ nm and an IR focus at $\lambda_{IR}=760$ nm.
Figure 9:
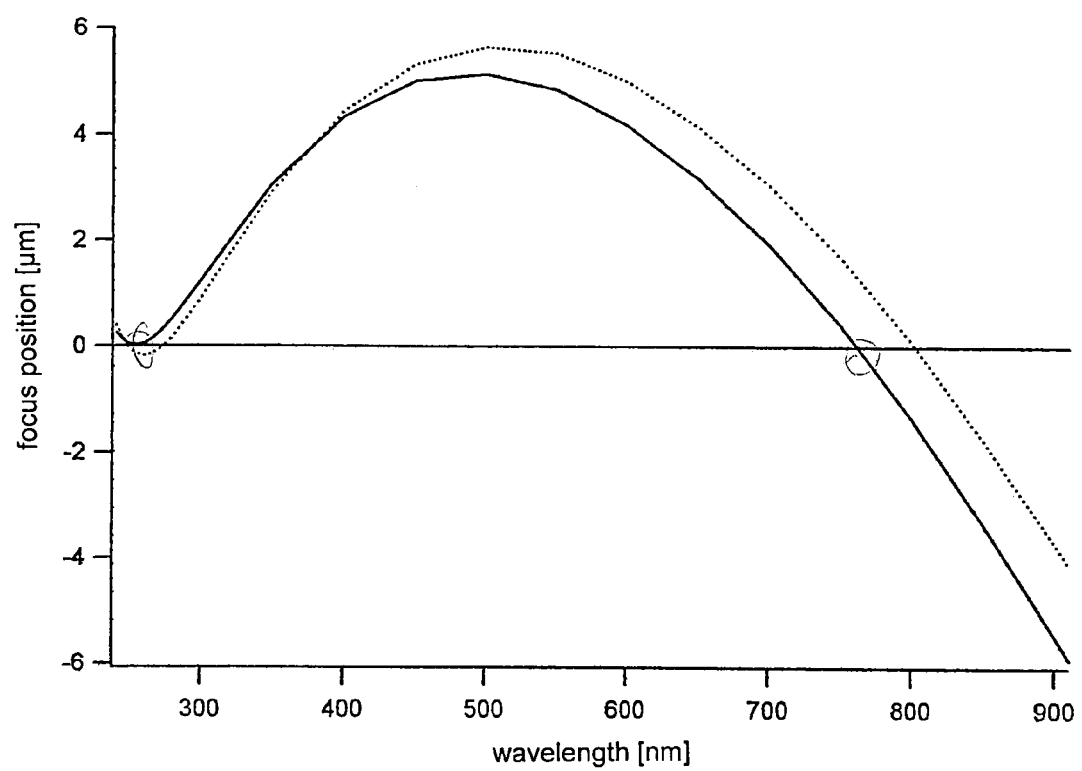
FIG. 9 shows the spectral image locus curves for the first objective of FIG. 1.

The 125×/0.90 objective depicted in FIG. 1 has a focal length of 1.60 mm, a focus for a DUV wavelength $\lambda_{DUV}$=248±8 nm, and a focus for an IR wavelength $\lambda_{IR}$=760 nm. It has as the converging lens group a doublet L11a+L11b, and as the diverging penultimate element according to the present invention a diverging doublet L12a+L12b, which comprises a diverging lens L12a made of quartz glass and a converging lens L12b made of fluorite. It is characterized by a longer focal length than the other exemplary embodiments. Design data for the objective are indicated in FIG. 5, and the spectral image locus curves in FIG. 9.

Figure 2:
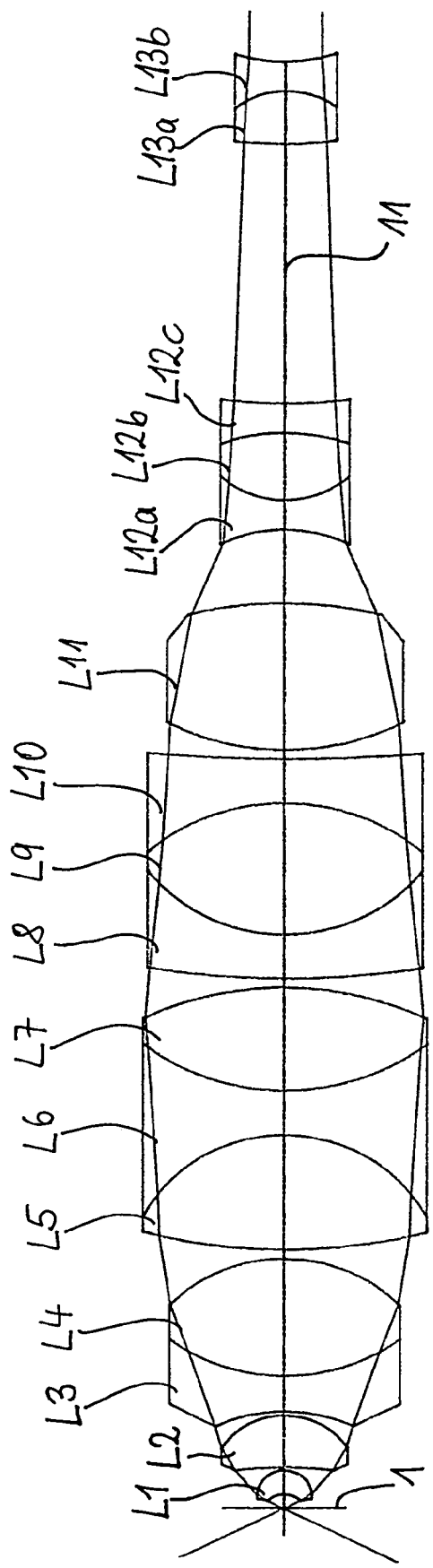
FIG. 2 shows a section through a second objective according to the present invention having a DUV focus at $\lambda_{DUV}=248$ nm and an IR focus at $\lambda_{IR}=825$ nm.
Figure 10:
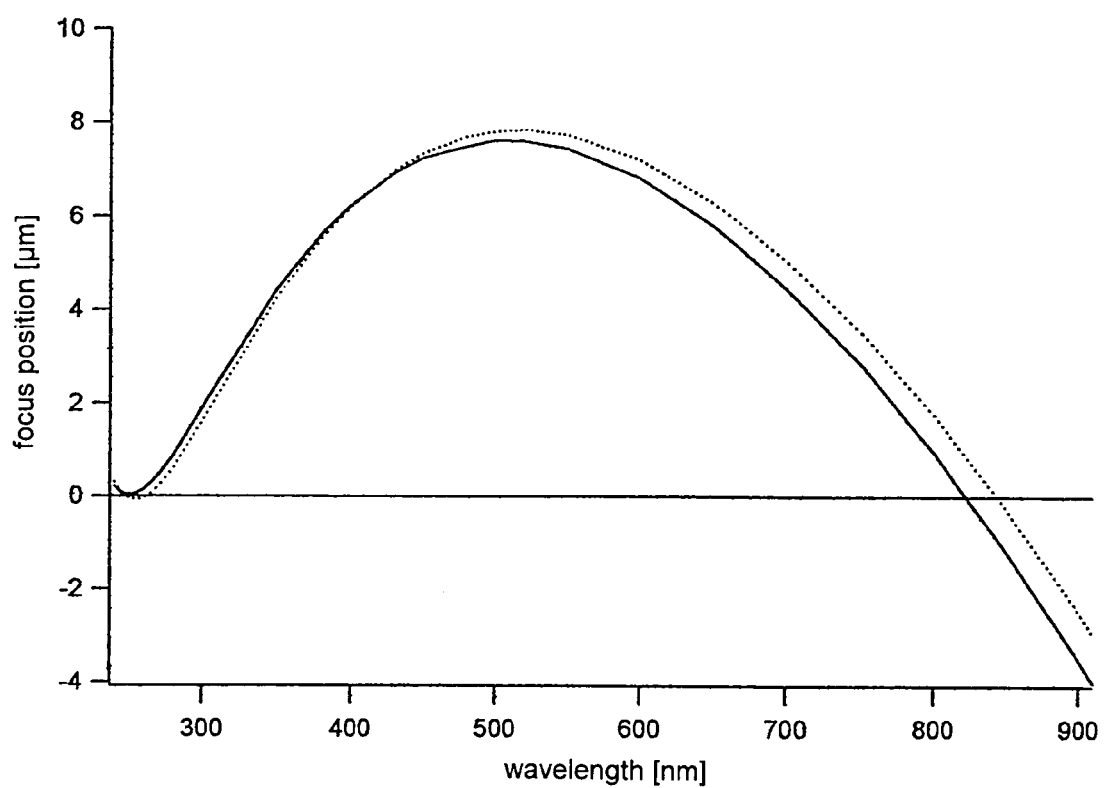
FIG. 10 shows the spectral image locus curves for the second objective of FIG. 2.

The 150×/0.90 objective depicted in FIG. 2 has a focal length of 1.33 mm, a DUV focus at $\lambda_{DUV}$=248±8 nm, and an IR focus at $\lambda_{IR}$=825 nm. It has as the converging lens group an individual lens L11, and as a diverging penultimate element according to the present invention a diverging triplet L12a+L12b+L12c made of quartz glass/fluorite/ quartz glass. It has slightly greater distortion than the other exemplary embodiments. Design data for the objective are indicated in FIG. 6, and spectral image locus curves in FIG. 10.

Figure 3:
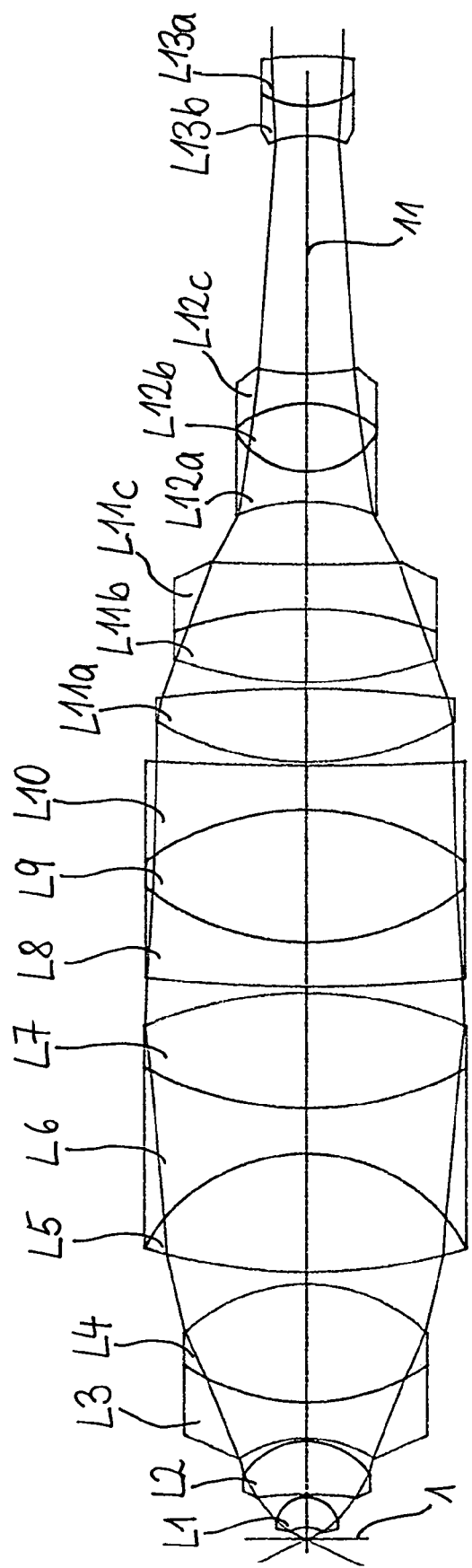
FIG. 3 shows a section through a third objective according to the present invention having a DUV focus at $\lambda_{DUV}=248$ nm and an IR focus at $\lambda_{IR}885$ nm.
Figure 11:
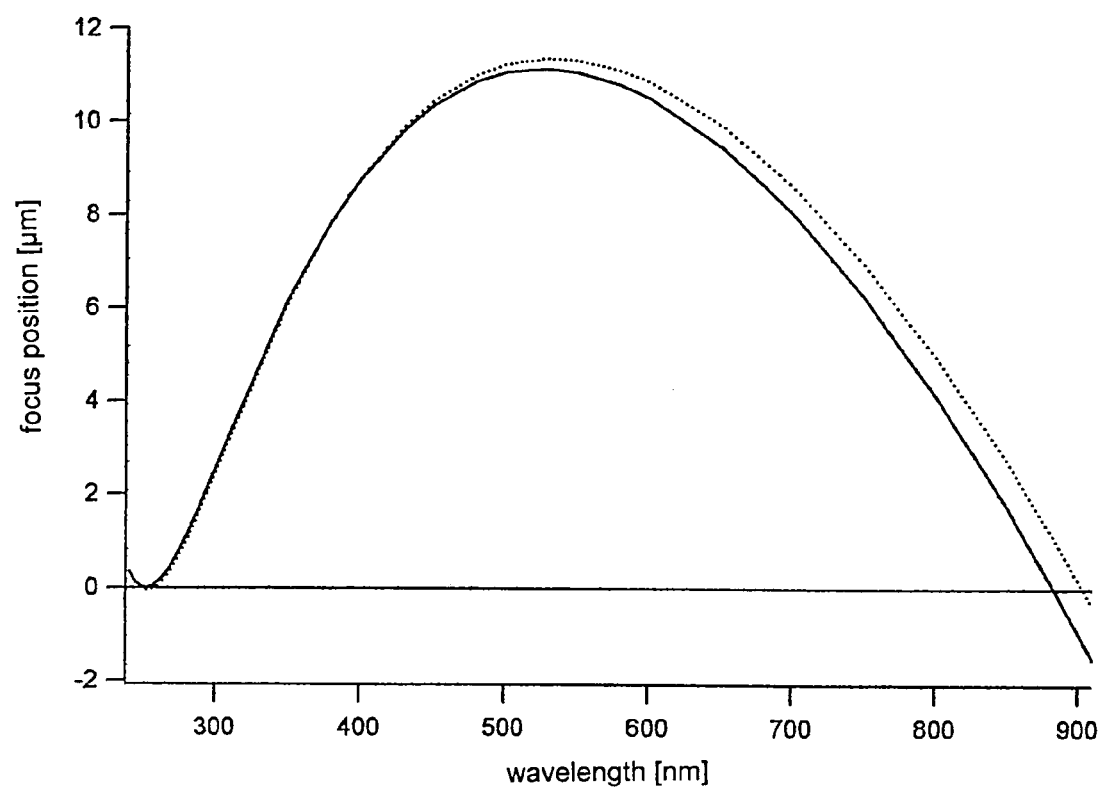
FIG. 11 shows the spectral image locus curves for the third objective of FIG. 3.

The 150×/0.90 objective depicted in FIG. 3 has a focal length of 1.33 mm, a DUV focus at $\lambda_{DUV}$=248±8 nm, and a parfocal focus at an IR wavelength $\lambda_{IR}$=885 nm. It has as the converging lens group a combination of an individual lens L11a and a doublet L11b+L11c, and as a diverging penultimate element a diverging triplet L12a+L12b+L12c according to the present invention made of quartz glass/fluorite/ quartz glass. The objective is well-corrected and relatively insensitive to tolerances. Design data for the objective are indicated in FIG. 7, spectral image locus curves in FIG. 11.

Figure 4:
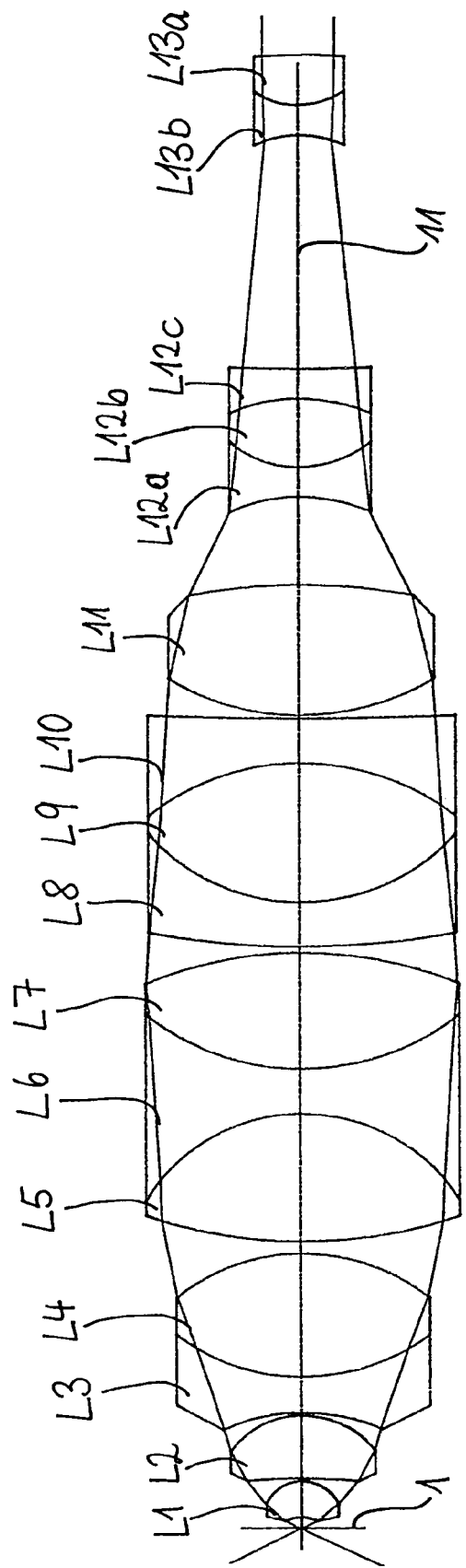
FIG. 4 shows a section through a fourth objective according to the present invention having a DUV focus at $\lambda_{DUV}=248$ nm and an IR focus at $\lambda_{IR}=905$ n.
Figure 12:
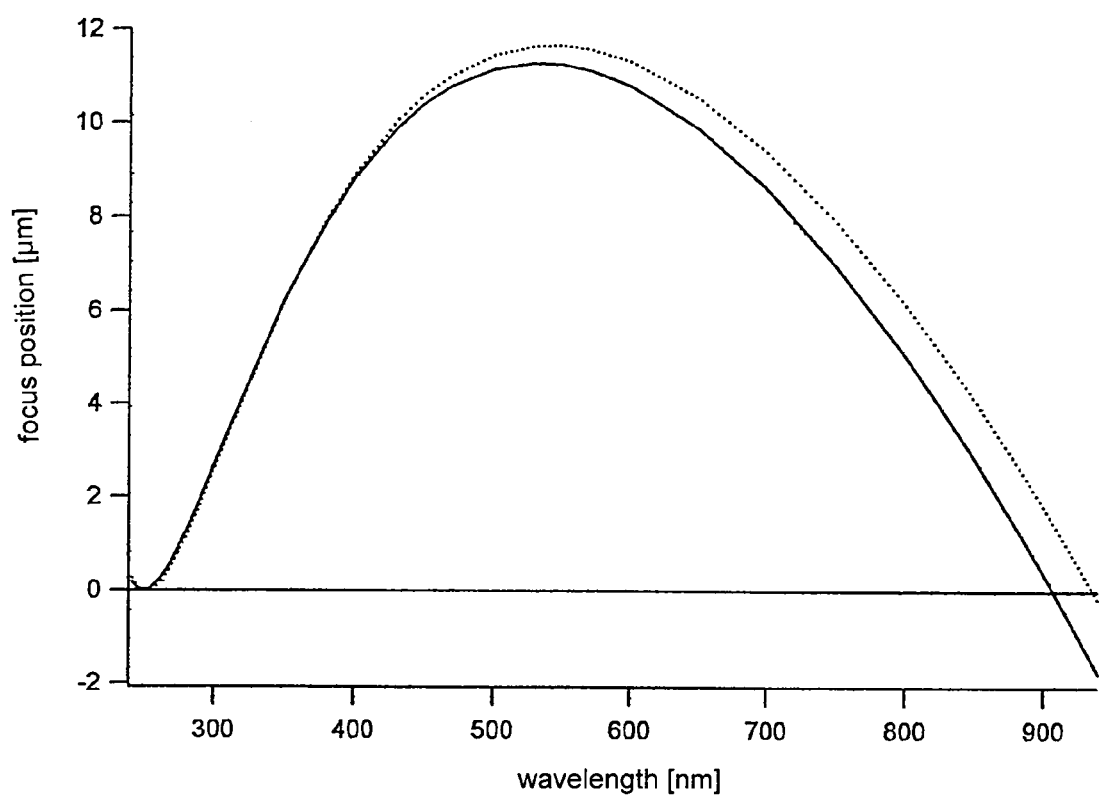
FIG. 12 shows the spectral image locus curves for the fourth objective of FIG. 4.

The 150×/0.90 objective depicted in FIG. 4 has a focal length of 1.33 mm, a DUV focus at $\lambda_{DUV}$=248±8 nm, and a parfocal IR focus at $\lambda_{IR}$=905 nm. It has as the converging lens group an individual lens L11, and as a diverging penultimate element a diverging triplet L12a+L12b+L12c according to the present invention made of quartz glass/ fluorite/quartz glass. The objective is characterized by low distortion, but it is more sensitive to tolerances than the other exemplary embodiments. Design data for the objective are indicated in FIG. 8, spectral image locus curves in FIG. 12.

Figure 13:
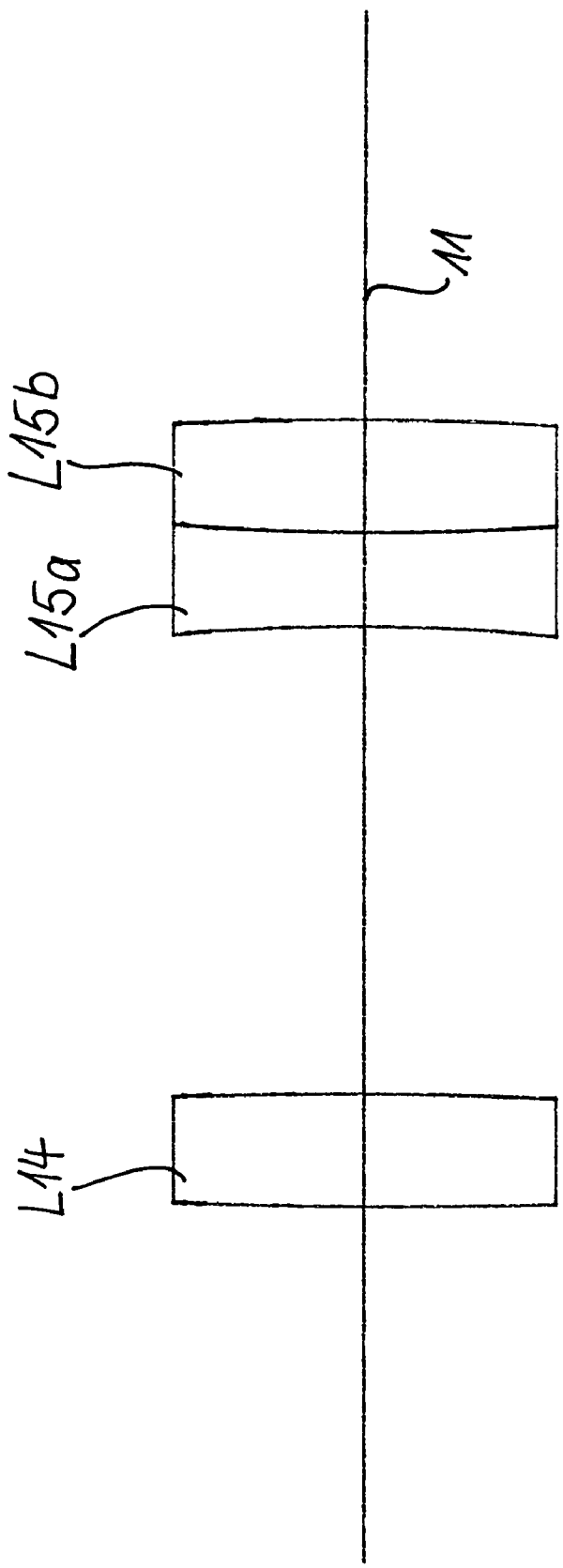
FIG. 13 shows a section through the tube lens system, tuned to $\lambda_{DUV}=248$ nm, used with the objectives of FIGS. 1 through 4.

The objectives of FIGS. 1 through 4 cited as examples are calculated for an infinity beam, and together with a tube lens constitute a compensation system for the DUV wavelength region $\lambda_{DUV}$=248 nm±8 nm. FIG. 13 shows a section through the tube lens system used with the objectives according to the present invention. It comprises a converging lens L14 and a doublet L15a+L15b. FIG. 14 shows Table 5 having the pertinent design data for the tube lens system shown in FIG. 13.

Figure 15:
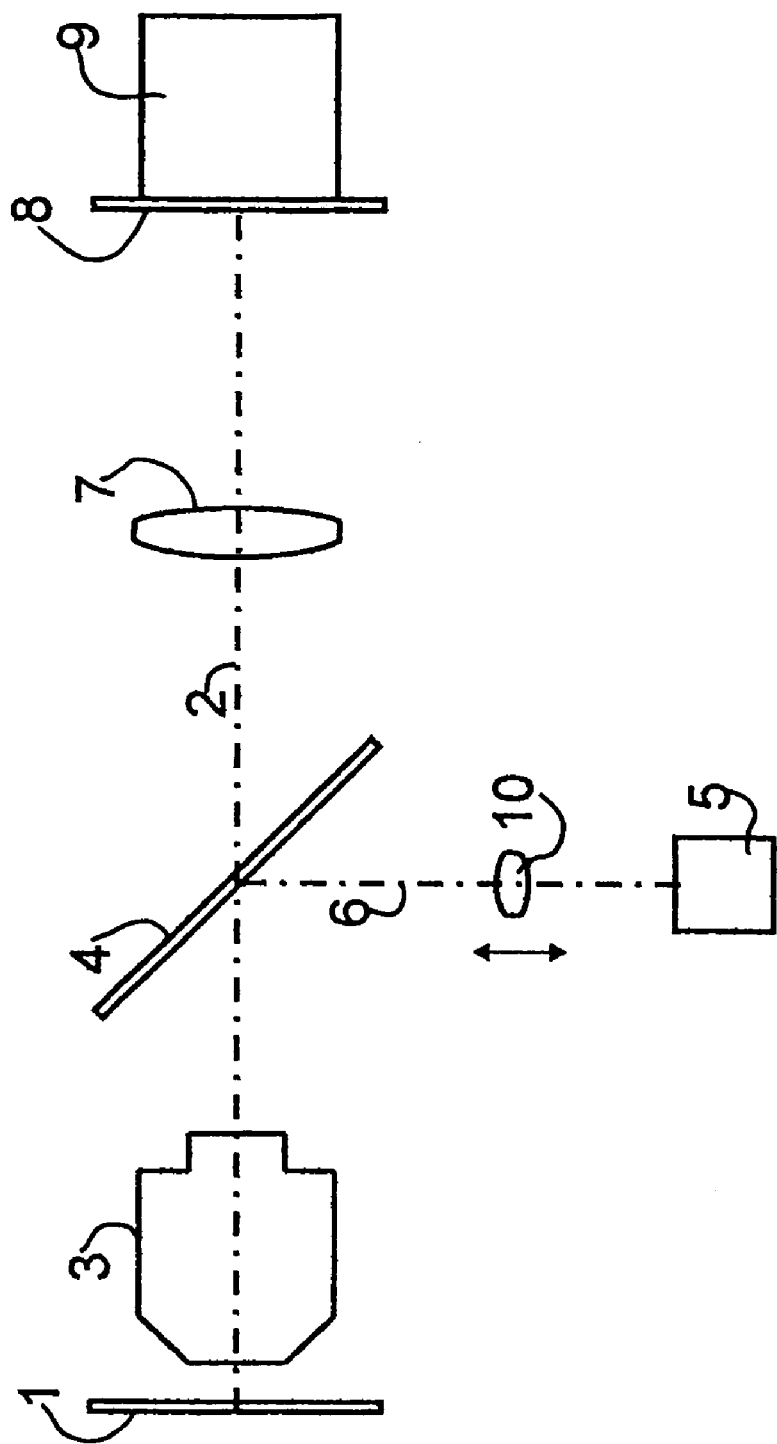
FIG. 15 shows the schematic configuration of the beam path between the objective, tube lens system and IR autofocus system.

Compensation is always performed for the selected DUV wavelength band $\lambda_{DUV} \pm \Delta\lambda$, but not for the respective IR wavelength, which is not imaged. This is illustrated by FIG. 15, which shows an image beam path 2 proceeding from an object 1. On this beam path, the DUV illumination light passes through an objective 3 to a beam splitter 4. This beam splitter 4 serves as the input and output element for the IR light of an IR laser autofocus system 5. The IR laser light emerging from IR laser autofocus system 5 via autofocus beam path 6 is deflected at beam splitter 4 to objective 3 and thus toward object 1, and returns in the opposite direction to IR laser autofocus system 5. The DUV light passes through beam splitter 4 and is imaged by a tube lens system 7 in an intermediate image plane 8, at the location of the target of a DUV camera 9. Since the IR light does not arrive at intermediate image plane 8, tube lens system 7 needs to be corrected only for the DUV light.

A different tube lens system compensating for the relevant DUV band must therefore be calculated in each case for objectives that are themselves calculated for different DUV wavelength bands.

A further application of the objectives can be explained with reference to FIG. 15. For example, an offset lens 10 can be inserted between beam splitter 4 and IR laser autofocus system 5. With this, the usable IR autofocus wavelength can be varied by a fixed amount of up to approximately ±20 nm. As a result, there exists around each IR focus wavelength $\lambda_{IR}$ a wavelength region in which the IR autofocus system can still be used. For example, with an objective for which an IR focus wavelength $\lambda_{IR}$=825 nm is specified (cf. FIG. 2), it is possible to autofocus using an IR autofocus system having a laser wavelength between 805 nm and 845 nm.

This means that the even the objective of FIG. 1 is IR autofocus-capable. This objective has a parfocal focus only for an IR wavelength $\lambda_{IR}$ =760 nm, which is not yet entirely assignable to the IR region, since according to standards the IR region begins at 780 nm. But with the use of an offset lens in the autofocus beam path, the objective can nevertheless be operated with a laser wavelength between 740 nm and 780 nm, and thus also at an IR wavelength (780 nm).

The width of the IR region around the specified IR focus wavelength that is usable with an objective depends on the slope of the spectral image locus curves at the zero transition at the IR focus wavelength. The flatter the zero transition, the wider the usable IR wavelength region for selection of the autofocus laser. This means that the wavelength region of interest for IR autofocus operation can be covered with a relatively small number of objectives.

Figure 16A:
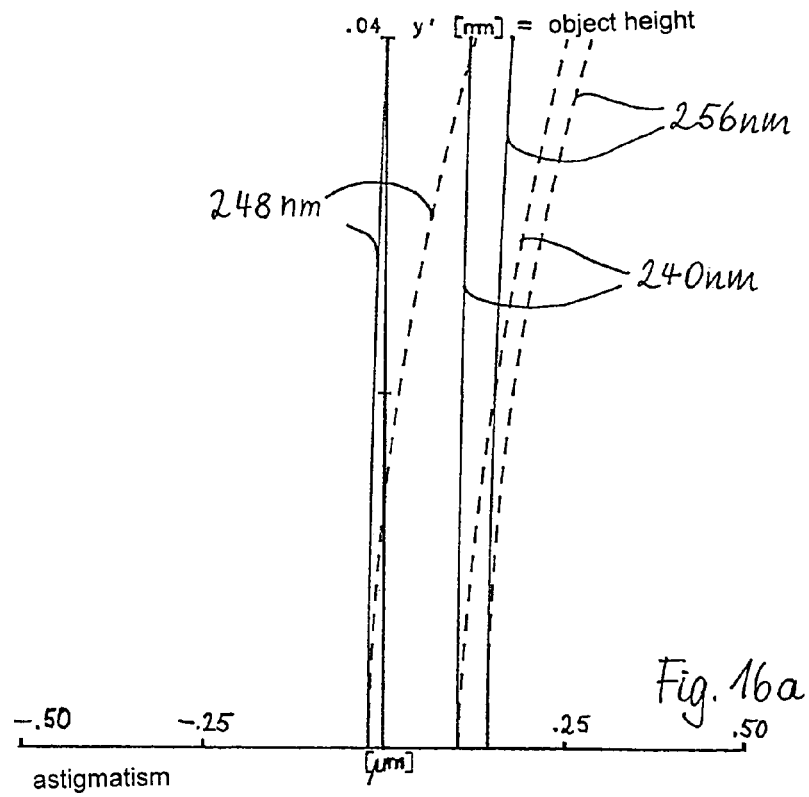
FIG. 16a shows the astigmatism for the compensation system comprising the objective of FIG. 4 and the tube lens system of FIG. 13.
Figures 16B, 16C:
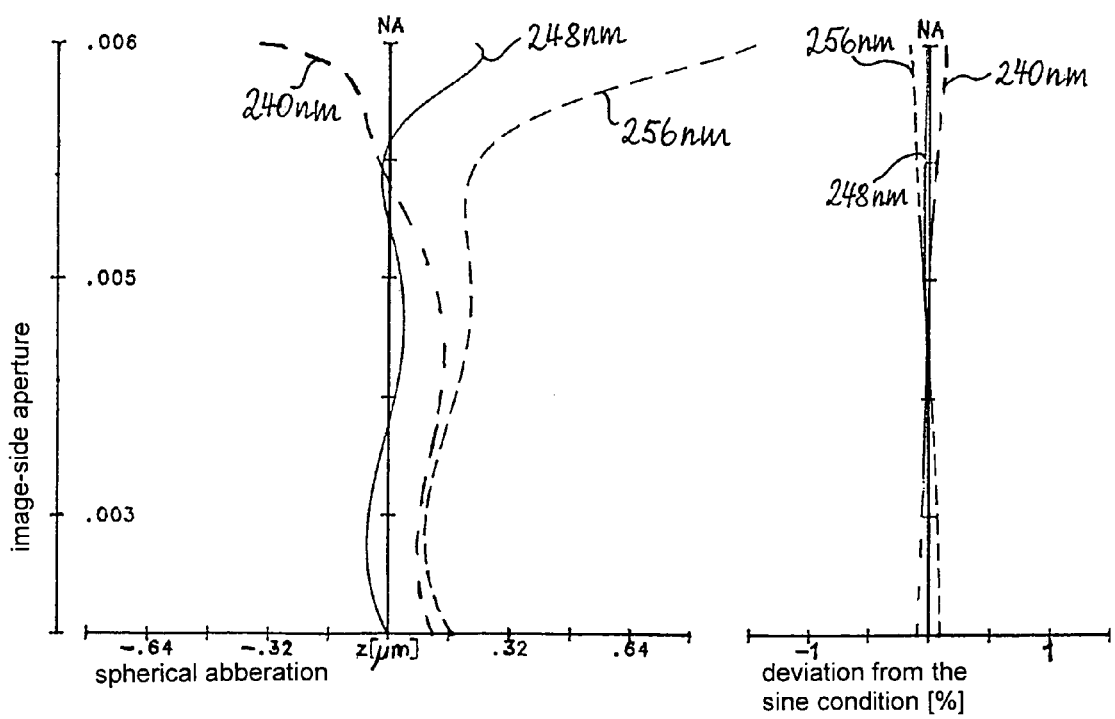
FIG. 16b shows the spherical aberration for the compensation system comprising the objective of FIG. 4 and the tube lens system of FIG. 13.
FIG. 16c shows the deviation from the sine condition for the compensation system comprising the objective of FIG. 4 and the tube lens system of FIG. 13.

FIGS. 16a through 16c show, by way of example, the correction of the compensation system (comprising the objective of FIG. 4 and the tube lens of FIG. 13) for each corrected DUV wavelength region, based on the average wavelength 248 nm and the two wavelengths spaced 8 nm away, i.e. 240 nm and 256 nm. FIG. 16a shows astigmatism as a function of object height y' (=distance of an object point from the optical axis) in the form of the sagittal image surface (solid line) and the meridional image surface (dashed line). FIG. 16b shows the spherical aberration z as a function of image-side aperture. FIG. 16c shows the deviation from the sine condition as a function of image-side aperture. It is evident that the compensation system is very well-corrected. The same also applies in similar fashion to the other exemplary embodiments.

The objectives in FIGS. 17 through 19 will now be described. They are all corrected for a DUV wavelength region $\lambda_{DUV}$=266 nm±8 nm, and differ in terms of the indicated IR focus wavelengths.

Figure 23:
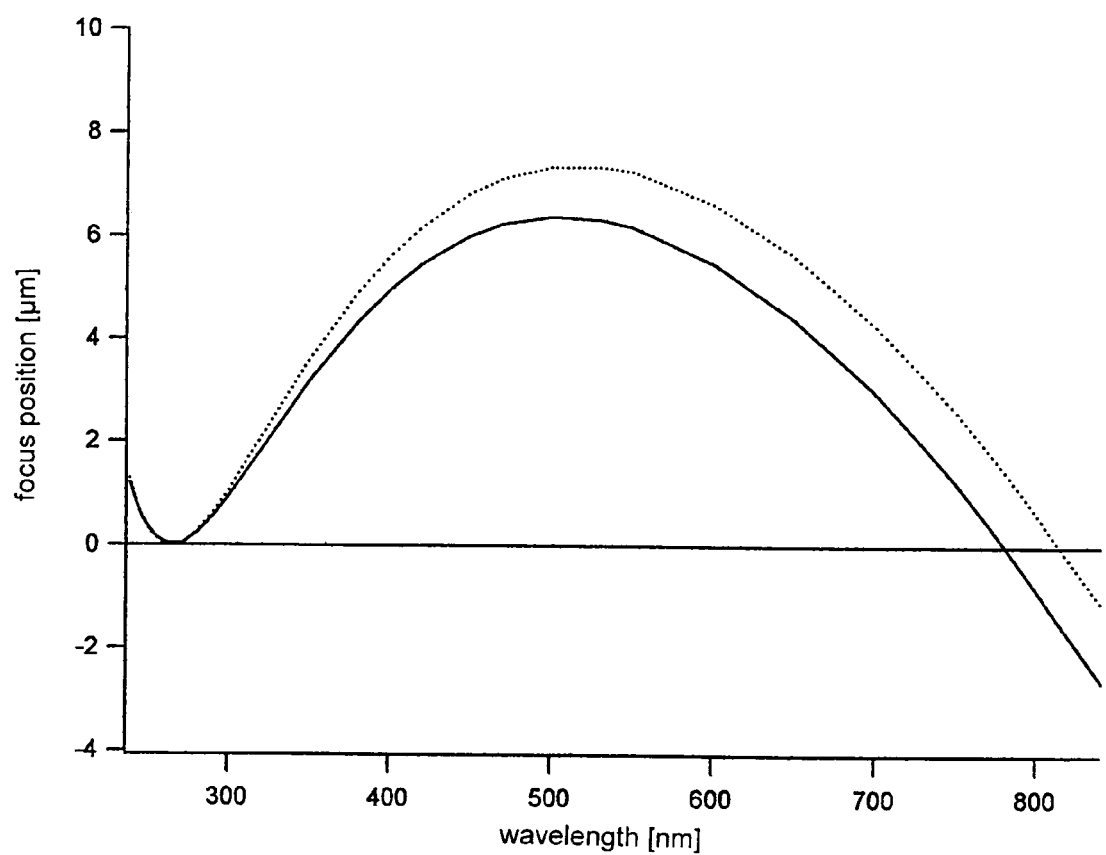
FIG. 23 shows the spectral image locus curves for the fifth objective of FIG. 17.

The 150×/0.90 objective depicted in FIG. 17 has a focal length of 1.33 mm, a DUV focus at $\lambda_{DUV}$=266±8 nm, and a parfocal IR focus at $\lambda_{IR}$=780 nm. It has a special feature in the front part: instead of individual second lens L2 and first doublet L3+L4 of the layout described above, it has a triplet L2+L3+L4 of fluorite/quartz glass/fluorite. The objective furthermore has as the converging lens group an individual lens L11a and a doublet L11b+L11c and as the diverging penultimate element according to the present invention a diverging triplet L12a+L12b+L12c made of quartz glass/fluorite/quartz glass. The objective is characterized by low distortion and is relatively insensitive to tolerances. Design data for the objective are indicated in FIG. 20, spectral image locus curves in FIG. 23.

Figure 24:
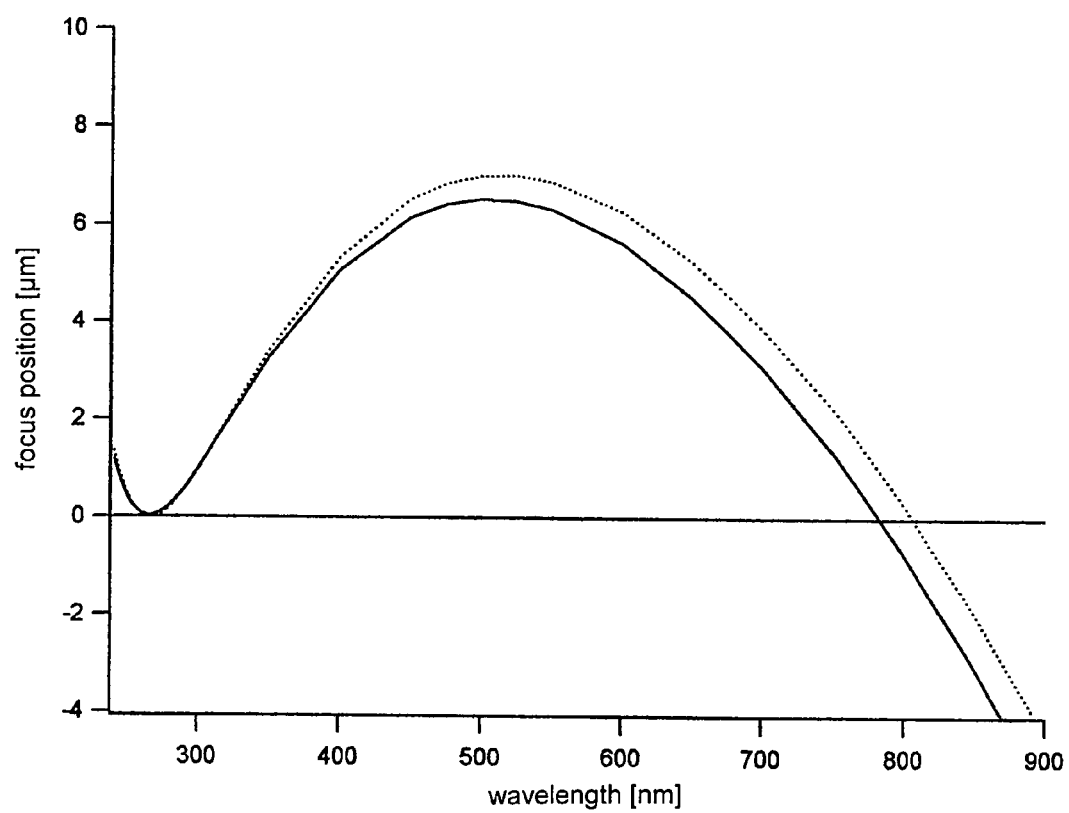
FIG. 24 shows the spectral image locus curves for the sixth objective of FIG. 18.

The 150×/0.90 objective depicted in FIG. 18 has a focal length of 1.33 mm, a DUV focus at $\lambda_{DUV}$=266±8 nm, and a parfocal IR focus at an IR wavelength $\lambda_{IR}$=785 nm. It has as the converging lens group an individual lens L11a and a doublet L11b+L11c, and as a diverging penultimate element a diverging triplet L12a+L12b+L12c according to the present invention made of quartz glass/fluorite/quartz glass. The objective is characterized by low distortion and is relatively insensitive to tolerances. Design data for the objective are indicated in FIG. 21, spectral image locus curves in FIG. 24.

Figure 25:
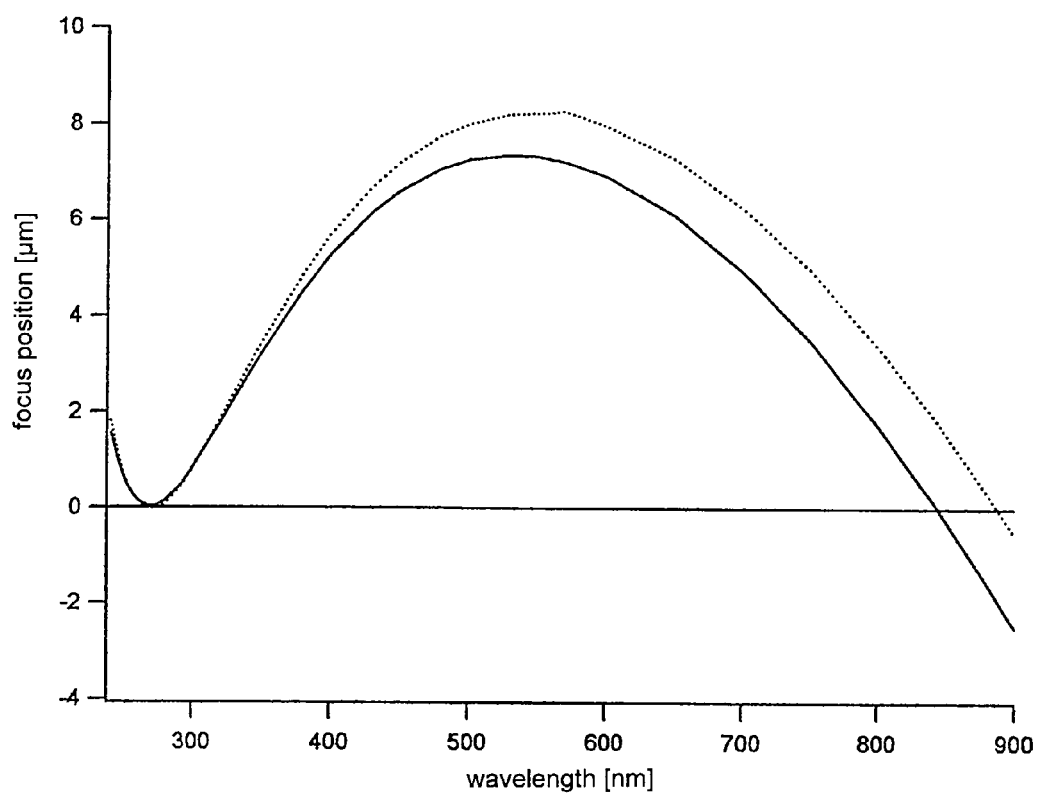
FIG. 25 shows the spectral image locus curves for the seventh objective of FIG. 19.

The 150×/0.90 objective depicted in FIG. 19 has a focal length of 1.33 mm, a DUV focus at $\lambda_{DUV}$=266±8 nm, and a parfocal focus at an IR wavelength $\lambda_{IR}$=845 nm. It once again has a special feature in the front part: instead of individual lens L2 and doublet L3+L4 of the layout described above, it has a triplet L2+L3+L4 of fluorite/quartz glass/fluorite. It furthermore has as the converging lens group an individual lens L11a and a doublet L11b+L11c, and as the diverging penultimate element according to the present invention has a diverging triplet L12a+L12b+L12c made of quartz glass/lithium fluoride/quartz glass. The use of lithium fluoride instead of fluorite in the diverging triplet reduces the longitudinal chromatic error. The objective therefore has very a well-corrected longitudinal chromatic error and is relatively insensitive to tolerances. Design data for the objective are indicated in FIG. 22, spectral image locus curves in FIG. 25.

Figure 26:
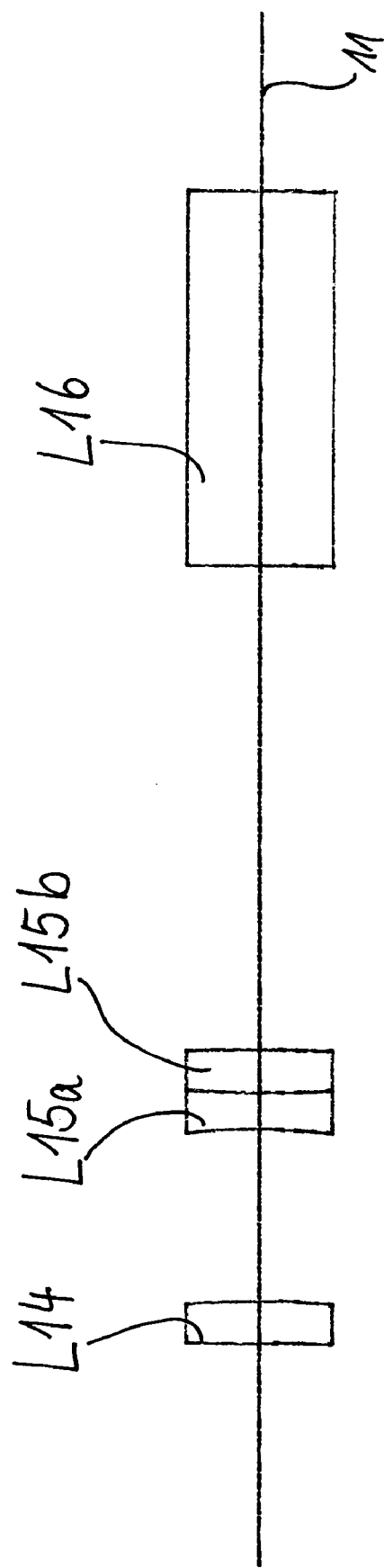
FIG. 26 shows a section through a tube lens system, tuned to $\lambda_{DUV}=266$ nm used with the objectives of FIGS. 17 through 19.

The objectives of FIGS. 17 through 19 are also calculated for an infinity beam, and together with a tube lens constitute a compensation system for the DUV wavelength region $\lambda_{DUV}$=266 nm±8 nm. FIG. 26 shows a section through the tube lens system used with the objectives according to the present invention of FIGS. 17 through 19. It comprises a converging lens L14, a doublet L15a+L15b, and a prism L16. FIG. 27 shows Table 9 having the pertinent design data for the tube lens system of FIG. 26.

The invention has been described in detail with particular reference to certain preferred embodiments thereof, but it will be understood that variations and modifications can be effected within the spirit and scope of the invention.

PARTS LIST

1 Object
2 Imaging beam path
3 Objective
4 Beam splitter
5 IR laser autofocus system
6 Autofocus beam path
7 Tube lens system
8 Intermediate image plane
9 DUV camera
10 Offset lens
11 Optical axis
L1–L13 Lenses of the objectives in FIGS. 1–4 and 17–19
L14–L15 Lenses of the tube lens systems of FIGS. 13 and 26
L16 Prism of the tube lens system of FIG. 26

What is claimed is:

1. A DUV-capable microscope objective, comprising:
a plurality of lens elements, on an object side, to generate convergent light;
a penultimate lens element which receives the convergent light from the plurality of lens elements; and
a further lens element, on an image side, which receives light from the penultimate lens element; wherein
the plurality of lens elements and the further lens element are made of quartz glass and fluorite and the penultimate lens element is made either of quartz glass and fluorite or of quartz glass and lithium fluoride,
the objective has a DUV focus at a DUV wavelength $\lambda_{DUV}$, wherein $\lambda_{DUV}$ is one wavelength in the deep ultraviolet region between 200 nm and 300 nm,
the objective has an IR focus for an IR wavelength $\lambda_{IR}$, wherein $\lambda_{IR}$ is one wavelength in the infrared region greater than or equal to 760 nm, at the same focal point as the DUV focus at $\lambda_{DUV}$, and
the penultimate lens element comprises a concave configuration on both sides, wherein an object-side radius of curvature of the penultimate lens element is smaller than its image-side radius of curvature.

2. The objective as defined in claim 1, wherein the penultimate lens element is a doublet, concave on both sides, and has a material sequence of quartz glass/fluorite in an imaging direction.

3. The objective as defined in claim 1, wherein the penultimate lens element is a diverging triplet lens, concave on both sides, and has a material sequence of quartz glass/fluorite/quartz glass in an imaging direction.

4. The objective as defined in claim 1, wherein the penultimate lens element is a diverging triplet lens, concave on both sides, that has a material sequence of quartz glass/lithium fluoride/quartz glass in an imaging direction.

5. The objective as defined in claim 1, wherein the penultimate lens element is diverging, is concave on both sides, and comprises individual lenses made of quartz glass and fluorite.

6. The objective as defined in claim 1, wherein the penultimate lens element is diverging, is concave on both sides, and comprises individual lenses made of quartz glass and lithium fluoride.

7. The objective as defined in claim 1, wherein the objective comprises, as viewed in an imaging direction:
a converging individual first lens comprising quartz glass as a front lens element disposed closest to an object being imaged;
a converging individual second lens element comprising fluorite;
a first doublet comprising a diverging third lens comprising quartz glass and a converging fourth lens comprising fluorite;
a first triplet combined of a fifth lens comprising fluorite, a sixth lens comprising quartz glass and a seventh lens comprising fluorite;
a second triplet combined of an eighth lens comprising quartz glass and a ninth lens comprising fluorite and a tenth lens comprising quartz glass;
a converging lens group comprising one or more lenses; and
the further lens element in the form of a diverging doublet comprising a converging lens comprising quartz glass and a diverging lens comprising fluorite,
wherein the penultimate lens element is diverging and is disposed between the converging lens group and the diverging doublet.

8. The objective as defined in claim 7, wherein the converging individual second lens and the first doublet are combined into a triplet lens having a material sequence fluorite/quartz glass/fluorite.

9. The objective as defined in claim 8, wherein the DUV focus includes a DUV wavelength region $\lambda_{DUV}$=266 nm±8 nm and an IR focus at $\lambda_{IR}$=780 nm.

10. The objective as defined in claim 8, wherein the DUV focus includes a DUV wavelength region $\lambda_{DUV}$=266 nm±8 nm and an IR focus at $\lambda_{IR}$=845 nm.

11. The objective as defined in claim 7, wherein the objective has a DUV focus in a DUV wavelength region $\lambda_{DUV}$=248 nm±8 nm or in a DUV wavelength region $\lambda_{DUV}$=266 nm±8 nm.

12. The objective as defined in claim 7, wherein the DUV focus includes a DUV wavelength region $\lambda_{DUV}$=248 nm±8 nm and an IR focus at $\lambda_{IR}$=760 nm.

13. The objective as defined in claim 7, wherein the DUV focus includes a DUV wavelength region $\lambda_{DUV}$=248 nm±8 nm and an IR focus at $\lambda_{IR}$=825 nm.

14. The objective as defined in claim 7, wherein the DUV focus includes a DUV wavelength region $\lambda_{DUV}$=248 nm±8 nm and an IR focus at $\lambda_{IR}$=885 nm.

15. The objective as defined in claim 7, wherein the DUV focus includes a DUV wavelength region $\lambda_{DUV}$=248 nm±8 nm and an IR focus at $\lambda_{IR}$=905 nm.

16. The objective as defined in claim 7, wherein the DUV focus includes a DUV wavelength region $\lambda_{DUV}$=266 nm±8 nm and an IR focus at $\lambda_{IR}$=785 nm.

17. The objective as defined in claim 1, wherein $\lambda_{IR}$ has a wavelength such that 760 nm$\geq \lambda_{IR} \geq$920 nm.

18. The objective as defined in claim 1, wherein the objective has a focal length of 1.6 mm or less.

19. The objective as defined in claim 1, wherein the objective has a numerical aperture of at least 0.90.

20. A DUV-capable microscope, comprising:
an objective comprising a plurality of lens elements, on an object side, to generate convergent light; a penultimate lens element which receives the convergent light from the plurality of lens elements;
and a further lens element, on an image side, which receives light from the penultimate lens element, wherein the objective has a DUV focus at a DUV wavelength $\lambda_{DUV}$, wherein $\lambda_{DUV}$ is one wavelength in the deep ultraviolet region between 200 nm and 300 nm, wherein the objective has an IR focus for an IR wavelength $\lambda_{IR}$, wherein $\lambda_{IR}$ is one wavelength in the infrared region greater than or equal to 760 nm, at the same focal point as the DUV focus at $\lambda_{DUV}$, and wherein the penultimate lens element comprises a concave configuration on both sides, the plurality of lens elements and the further lens element are made of quartz glass and fluorite and the penultimate lens element is made either of quartz glass and fluorite or of quartz glass and lithium fluoride, and wherein an object-side radius of curvature of the penultimate lens element is smaller than its image-side radius of curvature; and
an IR laser autofocus system in optical communication with the objective to provide light at the IR wavelength $\lambda_{IR}$ and auto-focusing.

21. The microscope as defined in claim 20, wherein the objective has a focal length of 1.6 mm or less.

22. The microscope as defined in claim 20, wherein the objective has a numerical aperture of at least 0.90.

23. A microscope objective, comprising:
a converging first lens disposed closest to an object being imaged;
a converging second lens disposed along an optical axis after the first lens;
a first doublet lens disposed along the optical axis after the second lens;
a first triplet lens disposed along the optical axis after the first doublet lens;
a second triplet lens disposed along the optical axis after the first triplet lens;
a converging lens group comprising one or more lenses disposed along the optical axis after the second triplet lens;
a diverging penultimate lens comprising concave outer sides, wherein an object-side radius of curvature is smaller than an image-side radius of curvature disposed along the optical axis after the converging lens group; and
a diverging doublet lens disposed after the penultimate lens,
wherein the objective has a focal length of 1.6 mm or less at a DUV wavelength $\lambda_{DUV}$, wherein $\lambda_{DUV}$ is one wavelength in the deep ultraviolet region between 200 nm and 300 nm, and at an IR wavelength $\lambda_{IR}$, wherein $\lambda_{IR}$ is one wavelength in the infrared region greater than or equal to 760 nm, wherein the lenses other than the penultimate lens are made of quartz glass and fluorite and the penultimate lens is made either of quartz glass and fluorite or of quartz glass and lithium fluoride, and wherein a numerical aperture of the objective is at least 0.8.

24. The objective as defined in claim 23, wherein the objective has a numerical aperture of at least 0.90.

25. A DUV-capable microscope, comprising:

an objective comprising a plurality of lens elements, on an object side, to generate convergent light; a penultimate lens element which receives the convergent light from the plurality of lens elements; and a further lens element, on an image side, which receives light from the penultimate lens element; wherein the objective has a DUV focus at a DUV wavelength, the objective has an IR focus for an IR wavelength at the same focal point as the DUV focus, and the penultimate lens element comprises a concave configuration on both sides, wherein an object-side radius of curvature of the penultimate lens element is smaller than its image-side radius of curvature, and the penultimate lens element is made either of quartz glass and fluorite or of quartz glass and lithium fluoride.

26. The microscope as defined in claim 25, wherein the objective has a numerical aperture of at least 0.90.

* * * * *